US009898838B2

United States Patent
Shim et al.

(10) Patent No.: US 9,898,838 B2
(45) Date of Patent: Feb. 20, 2018

(54) GRAPHICS PROCESSING APPARATUS AND METHOD FOR DETERMINING LEVEL OF DETAIL (LOD) FOR TEXTURING IN GRAPHICS PIPELINE

(71) Applicant: Samsung Electronics Co., Ltd., Suwon-si (KR)

(72) Inventors: Heejun Shim, Seoul (KR); Kwontaek Kwon, Hwaseong-si (KR); Sunmin Kwon, Seoul (KR); Hoyoung Kim, Seoul (KR); Seonghun Jeong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/073,731

(22) Filed: Mar. 18, 2016

(65) Prior Publication Data

US 2017/0091961 A1  Mar. 30, 2017

(30) Foreign Application Priority Data

Sep. 24, 2015  (KR) .......................... 10-2015-0135551

(51) Int. Cl.
| | |
|---|---|
| *G06T 15/04* | (2011.01) |
| *G06T 11/00* | (2006.01) |
| *G06T 1/20* | (2006.01) |

(52) U.S. Cl.
CPC .............. *G06T 11/001* (2013.01); *G06T 1/20* (2013.01); *G06T 15/04* (2013.01); *G06T 2210/36* (2013.01)

(58) Field of Classification Search
CPC .............................. G06T 15/04; G06T 11/001
See application file for complete search history.

(56) References Cited

U.S. PATENT DOCUMENTS 5,760,783 A * 6/1998 Migdal ................... G06T 15/04
                                                          345/587
5,945,997 A * 8/1999 Zhao ....................... G06T 11/40
                                                          345/581

(Continued)

FOREIGN PATENT DOCUMENTS

KR        10-0745768 B1     8/2007

OTHER PUBLICATIONS shmoop.com, "Triangle Proportionality Theorem", Oct. 25, 2014, http://www.shmoop.com/similar-triangles/triangle-proportionality-theorem.html, pp. 1-4.*

(Continued)

*Primary Examiner* — Barry Drennan
*Assistant Examiner* — Phong Nguyen
(74) *Attorney, Agent, or Firm* — F. Chau & Associates, LLC

(57) ABSTRACT

A method of determining a level of detail (LOD) for a texturing includes: acquiring texture coordinate data on pixels included in an upper block; determining a reference quad among quads included in the upper block; determining a similarity between the determined reference quad and the upper block using texture coordinates of the determined reference quad and the upper block; and determining LODs of remaining quads among the quads included in the upper block to be the same as an LOD of the determined reference quad in response to the determining of the similarity including determining that the determined reference quad and the upper block are similar.

16 Claims, 20 Drawing Sheets

(56) References Cited

U.S. PATENT DOCUMENTS

| | | | | |
|---|---|---|---|---|
| 6,002,407 | A * | 12/1999 | Fadden | G06T 15/005 345/428 |
| 6,078,335 | A * | 6/2000 | Wong | G06T 15/04 345/582 |
| 6,104,415 | A * | 8/2000 | Gossett | G06T 15/005 345/531 |
| 6,232,981 | B1 * | 5/2001 | Gossett | G06T 15/04 345/582 |
| 6,618,049 | B1 * | 9/2003 | Hansen | G06T 15/20 345/423 |
| 6,975,319 | B1 * | 12/2005 | Donovan | G06T 15/04 345/422 |
| 7,271,810 | B1 * | 9/2007 | Newhall, Jr. | G06T 15/04 345/582 |
| 7,369,136 | B1 * | 5/2008 | Heckbert | G06T 15/04 345/582 |
| 7,369,140 | B1 | 5/2008 | King et al. | |
| 7,663,621 | B1 * | 2/2010 | Allen | G06T 15/04 345/419 |
| 7,773,092 | B1 * | 8/2010 | Heckbert | G06T 15/04 345/582 |
| 7,859,552 | B2 * | 12/2010 | Hatasawa | G06T 3/4053 345/582 |
| 9,036,860 | B2 * | 5/2015 | Chen | H04N 1/60 345/581 |
| 2004/0207631 | A1 * | 10/2004 | Fenney | G06T 15/04 345/584 |
| 2005/0007380 | A1 * | 1/2005 | Haaker | G06T 15/04 345/582 |
| 2005/0156940 | A1 * | 7/2005 | Haaker | G06T 15/04 345/582 |
| 2008/0055335 | A1 * | 3/2008 | Jung | G06T 15/04 345/609 |
| 2008/0094407 | A1 * | 4/2008 | Xu | G06T 1/60 345/552 |
| 2008/0273042 | A1 | 11/2008 | Cai et al. | |
| 2010/0091028 | A1 | 4/2010 | Grossman et al. | |
| 2011/0157208 | A1 * | 6/2011 | Hwang | G06T 3/40 345/582 |
| 2012/0038657 | A1 * | 2/2012 | Grossman | G06T 15/04 345/585 |
| 2013/0321443 | A1 * | 12/2013 | Pahwa | G06T 15/04 345/587 |
| 2015/0379341 | A1 * | 12/2015 | Agrawal | G06T 7/11 382/176 |
| 2016/0140737 | A1 * | 5/2016 | Hui | G06T 15/04 345/583 |
| 2016/0364900 | A1 * | 12/2016 | Seiler | G06T 11/001 |

OTHER PUBLICATIONS

European Search Report issued in corresponding European Application No. 16166069.1 dated Feb. 14, 2017.

* cited by examiner

<SIMILARITY CONDITIONS>
① SAME AXIS
② FOR X AXIS : ABS(MAXEU OF UPPER BLOCK−7×MAXEU OF REFERENCE QUAD) < THRESHOLD VALUE
  FOR Y AXIS : ABS(MAXEU OF UPPER BLOCK−3×MAXEU OF REFERENCE QUAD) < THRESHOLD VALUE
FOR DIAGONAL LINE : ABS(2×MAXEU OF UPPER BLOCK−15×MAXEU OF REFERENCE QUAD) < 2×THRESHOLD VALUE
  ≑ ABS(MAXEU OF UPPER BLOCK−7.6×MAXEU OF REFERENCE QUAD) < THRESHOLD VALUE

<SIMILARITY CONDITIONS>
① SAME AXIS
② ABS(MAXEU OF UPPER BLOCK−3×MAXEU OF REFERENCE PIXEL GROUP) < THRESHOLD VALUE

GRAPHICS PROCESSING APPARATUS AND METHOD FOR DETERMINING LEVEL OF DETAIL (LOD) FOR TEXTURING IN GRAPHICS PIPELINE

CROSS-REFERENCE TO RELATED APPLICATION(S)

This application claims the benefit under 35 USC 119(a) of Korean Patent Application No. 10-2015-0135551, filed on Sep. 24, 2015, in the Korean Intellectual Property Office, the entire disclosure of which is incorporated herein by reference for all purposes.

BACKGROUND

1. Field

The following description relates to a graphics processing apparatus and a method of determining a level of detail (LOD) for a texturing in a graphics pipeline.

2. Description of the Related Art

A texturing technique or texture mapping technique is utilized as one method of obtaining more realistic images in a three-dimensional (3D) graphics system. Texturing or texture mapping denotes a method of applying a two-dimensional (2D) image to a surface of a three-dimensional (3D) object in order to add a texture to the surface of the 3D object. Here, the texture is a 2D image, and each point in the texture is called a texel and corresponds to a pixel on a screen space. When an object surface in a 3D space corresponding to each pixel of a 2D screen space is determined while a 3D graphics pipeline is processed, texels having texture coordinates corresponding to the object surface are calculated, and thus texture mapping between the pixels and the texels may be performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a method of determining a level of detail (LOD) for a texturing includes: acquiring texture coordinate data on pixels included in an upper block; determining a reference quad among quads included in the upper block; determining a similarity between the determined reference quad and the upper block using texture coordinates of the determined reference quad and the upper block; and determining LODs of remaining quads among the quads included in the upper block to be the same as an LOD of the determined reference quad in response to the determining of the similarity including determining that the determined reference quad and the upper block are similar.

The determining of the similarity may include determining the similarity using a first distance between first texture coordinates corresponding to two pixels of the determined reference quad and a second distance between second texture coordinates corresponding to two pixels positioned at two edges of the upper block.

The first texture coordinates may include two sets of texture coordinates separated by a maximum distance among texture coordinates corresponding to four pixels of the determined reference quad.

The second texture coordinates may include two sets of texture coordinates separated by a maximum distance among texture coordinates corresponding to four pixels positioned at four edges of the upper block.

The determining of the similarity may include determining the similarity using the first distance and the second distance in response to a determination that the two pixels of the determined reference quad and the two pixels positioned at the two edges of the upper block are pixels of corresponding positions.

The determining of the similarity may include: determining whether two pixels corresponding to first texture coordinates separated by a maximum distance among four sets of texture coordinates corresponding to the determined reference quad and two pixels corresponding to second texture coordinates separated by a maximum distance among four sets of texture coordinates corresponding to pixels positioned at four edges of the upper block are pixels of corresponding positions; and determining the similarity using a first distance, which is the maximum distance between the first texture coordinates, and a second distance, which is the maximum distance between the second texture coordinates, in response to a determination that the two pixels corresponding to the first texture coordinates and the two pixels corresponding to the second texture coordinates are the pixels of the corresponding positions.

The determining of the similarity may include determining that the determined reference quad and the upper block are similar in response to an absolute value of a difference between the first distance multiplied by N and the second distance being less than a threshold value, wherein N is a natural number.

N may have a value based on a number of pixels between the two pixels corresponding to the second texture coordinates in the upper block.

The upper block may include any one of 1×2 quads of 8 pixels, 2×1 quads of 8 pixels, 2×2 quads of 16 pixels, 4×2 quads of 32 pixels, 2×4 quads of 32 pixels, and 4×4 quads of 64 pixels.

The determined reference quad may be a quad positioned closest to a center of the upper block among the quads included in the upper block.

The LODs of the remaining quads included in the upper block may be determined separately from the LOD of the determined reference quad in response to a determination that the determined reference quad and the upper block are not similar.

According to another general aspect, a non-transitory computer-readable recording medium includes stored instructions configured to execute the method of determining the LOD for the texturing operation.

According to another general aspect, a graphics processing apparatus includes: a processor; an acquirer implemented by the processor and configured to acquire texture coordinate data on pixels included in an upper block; a reference quad determiner implemented by the processor and configured to determine a reference quad among quads included in the upper block; a similarity determiner implemented by the processor and configured to determine a similarity between the determined reference quad and the upper block using texture coordinates of the determined reference quad and the upper block; and a level of detail (LOD) determiner implemented by the processor and configured to determine LODs of remaining quads among the quads included in the upper block to be the same as an LOD of the determined reference quad when it is determined that the determined reference quad and the upper block are similar.

The similarity determiner may be configured to determine the similarity using a first distance between first texture coordinates corresponding to two pixels of the determined reference quad and a second distance between second texture coordinates corresponding to two pixels positioned at two edges of the upper block.

The first texture coordinates may include two sets of texture coordinates separated by a maximum distance among texture coordinates corresponding to four pixels of the determined reference quad. The second texture coordinates may include two sets of texture coordinates separated by a maximum distance among texture coordinates corresponding to four pixels positioned at four edges of the upper block.

The similarity determiner may be configured to determine the similarity using the first distance and the second distance in response to a determination that the two pixels of the determined reference quad and the two pixels positioned at the two edges of the upper block being pixels of corresponding positions.

The similarity determining unit may be configured to: determine whether two pixels corresponding to first texture coordinates separated by a maximum distance among four sets of texture coordinates corresponding to the determined reference quad and two pixels corresponding to second texture coordinates separated by a maximum distance among four sets of texture coordinates corresponding to pixels positioned at four edges of the upper block are pixels of corresponding positions; and determine the similarity using a first distance, which is the maximum distance between the first texture coordinates, and a second distance, which is the maximum distance between the second texture coordinates, in response to a determination that the two pixels corresponding to the first texture coordinates and the two pixels corresponding to the second texture coordinates are the pixels of the corresponding positions.

The similarity determiner may be configured to determine that the determined reference quad and the upper block are similar to each other in response to an absolute value of a difference between the first distance multiplied by N and the second distance being less than a threshold value. N may be a natural number having a value based on a number of pixels between the two pixels corresponding to the second texture coordinates in the upper block.

The upper block may include any one of 1×2 quads of 8 pixels, 2×1 quads of 8 pixels, 2×2 quads of 16 pixels, 4×2 quads of 32 pixels, 2×4 quads of 32 pixels, and 4×4 quads of 64 pixels.

The LOD determiner may be configured to determine the LODs of the remaining quads included in the upper block separately from the LOD of the determined reference quad in response to a determination that the determined reference quad and the upper block are not similar.

According to another general aspect, a method of determining a level of detail (LOD) for a texturing operation includes: acquiring texture coordinate data on pixels included in an upper block; determining a reference quad among quads included in the upper block; and in response to a determination that the reference quad is similar to the upper block, calculating an LOD of the reference quad and determining LODs of remaining quads among the quads included in the upper block based on the LOD of the reference quad.

The method may further include determining that the reference quad is similar to the upper block using a first distance between first texture coordinates corresponding to two pixels of the reference quad and a second distance between second texture coordinates corresponding to two pixels positioned at two edges of the upper block.

The first texture coordinates may include two sets of texture coordinates separated by a maximum distance among texture coordinates corresponding to four pixels of the determined reference quad. The second texture coordinates may include two sets of texture coordinates separated by a maximum distance among texture coordinates corresponding to four pixels positioned at four edges of the upper block.

The determining that the reference quad is similar to the upper block may include determining that the reference quad is similar to the upper block using the first distance and the second distance in response to determining that the two pixels of the determined reference quad and the two pixels positioned at the two edges of the upper block are on a same axis.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms used in the example embodiments have been selected as general terms which are widely used at present, in consideration of the functions of the exemplary embodiments, but may be altered according to the intent of an operator skilled in the art, conventional practice, or introduction of new technology. Also, if there is a term which is arbitrarily selected by the applicant in a specific case, in this case, the meaning of the term will be described in detail in a corresponding description portion of the example embodiments. Therefore, the terms used herein should be defined on the basis of the entire content of the embodiments instead of a simple name of each of the terms.

In the following description of embodiments, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when one part is referred to as "comprising (or including or having)" other elements, it should be understood that it can comprise (or include or have) only those elements, or other elements as well as those elements if there is no specific limitation.

The term ""including" used herein should not be construed to imply that all of the disclosed elements or steps are included, but should be construed to indicate that some of the elements or steps may not be included, or that additional elements or steps may be included. As used herein, the term "and/or" includes any and all combinations of one or more of the associated listed items. Expressions such as "at least one of," when preceding a list of elements, modify the entire list of elements and do not modify the individual elements of the list.

Figure 1:
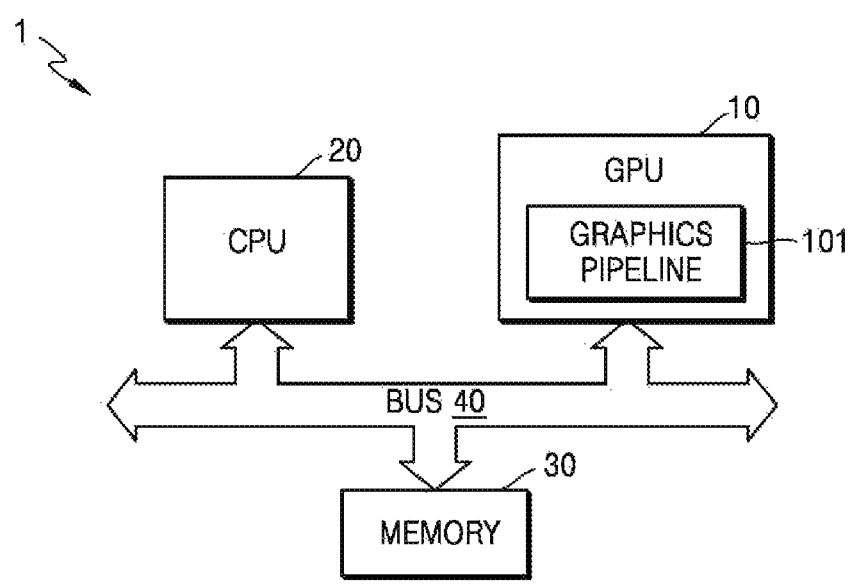
FIG. 1 is a block diagram of a computing system, according to an embodiment.

FIG. 1 is a block diagram of a computing system 1, according to an embodiment. Referring to FIG. 1, the computing system 1 includes a graphics processing unit (GPU) 10, a central processing unit (CPU) 20, a memory 30, and a bus 40. The GPU 10 and the CPU 20 may correspond to processing devices, and various types of processors other than the GPU 10 and the CPU 20 may be included in the processing devices. In FIG. 1, only elements associated with example embodiments are shown as being included in the computing system 1. Accordingly, it is to be understood by those skilled in the art that other general-purpose elements may be included in addition to the elements shown in FIG. 1.

Examples of the computing system 1 include, but are not limited to, a desktop computer, a notebook computer, a smartphone, a personal digital assistant (PDA), a mobile media player, a video game console, a television set-top box, a tablet device, an e-book reader, a wearable device, etc. That is, various devices may be further included in the computing system 1.

The processing devices such as the GPU 10 and the CPU 20 correspond to hardware that processes various operations. The CPU 20 operates as hardware that controls overall functions of the computing system 1 and controls other elements such as the GPU 10 and the memory 30. The CPU 20 performs various kinds of operations for controlling functions of the computing system 1. In order to process three-dimensional (3D) or two-dimensional (2D) graphics data, the GPU 10 operates as hardware that controls a graphics processing function of the computing system 1. That is, while processing various kinds of graphics pipelines 101 such as Open Graphics Library (OpenGL), DirectX, and Compute Unified Device Architecture (CUDA), the GPU 10 performs operations (e.g., a shading operation, a texturing operation, etc.) associated with the graphics pipelines 101.

The memory 30 may correspond to a random access memory (RAM), such as a dynamic random access memory (DRAM), a static random access memory (SRAM), etc., or a device, such as a read-only memory (ROM), an electrically erasable programmable read-only memory (EEPROM), etc. That is, the memory 30 stores data that has been processed by the GPU 10 or the CPU 20, or corresponds to a device that provides data to be executed by the GPU 10 or the CPU 20. For example, the memory 30 stores or provides texturing-associated data.

The bus 40 is hardware that connects hardware devices in the computing system 1 in order to transmit and receive data between the hardware devices. Examples of the bus 40 may include various types of buses such as a Peripheral Component Interconnect (PCI) bus and a PCI Express bus.

Figure 2:
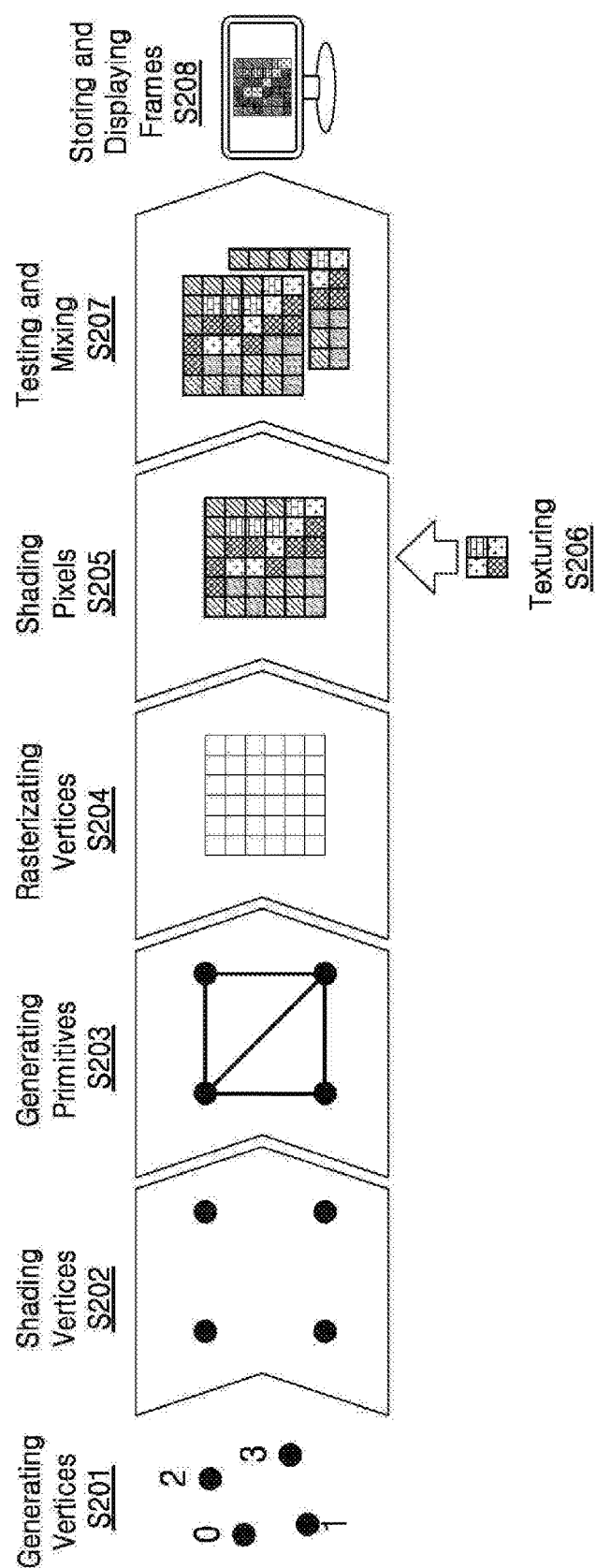
FIG. 2 is a diagram for describing a graphics pipeline processed by a graphics processing unit (GPU), according to an embodiment.

FIG. 2 is a diagram for describing a graphics pipeline processed by a GPU, according to an embodiment. Referring to FIG. 2, an entire process of the graphics pipeline 101 (see FIG. 1) is divided into geometry transformation, rasterization, and pixel shading.

Operation S201 is an operation of generating vertices. The vertices are generated to indicate objects included in 3D graphics.

Operation S202 is an operation of shading the generated vertices. A vertex shader performs vertex shading by defining positions of the vertices generated in operation 201.

Operation S203 is an operation of generating primitives. A primitive denotes a point, a line, or a polygon that is formed using one or more vertices. For example, the primitive may be a triangle formed by connecting three vertices.

Operation S204 is an operation of rasterizing the primitive. The rasterization of the primitive denotes a method of dividing the primitive into fragments. A fragment may be a basic unit for performing graphics processing on the primitive. Since the primitive includes only information regarding vertices, the 3D graphics processing may be performed by generating vertices and fragments between the vertices through the rasterization.

Operation S205 is an operation of shading pixels. The fragments constituting the primitive and generated through the rasterization correspond to pixels on a screen space. In this field, the terms "fragment" and "pixel" are used interchangeably depending on the case. For example, the pixel shader may be called a fragment shader. In general, a basic unit of graphic processing, which constitutes the primitive, may be referred to as a fragment, and a basic unit of graphic processing to be performed through the pixel shading may be referred to as a pixel. Values and attributes (e.g., colors) of pixels are determined through the pixel shading.

Operation S206 is a texturing operation for determining colors of the pixels. The texturing denotes a process of determining colors of the pixels using previously prepared textures. The colors of all of the pixels are calculated and determined to represent various colors and patterns in the pixels. The GPU 10 determines the colors of the pixels using the previously prepared textures. In this case, the textures with different resolutions may be previously defined and prepared to adaptively correspond to the size of the object to be drawn in any pixels. A sequence of predefined textures having different resolutions is called a mipmap.

Operation S207 is a testing and mixing operation. Pixel values to be finally displayed through, for example, a depth test, curling, and clipping are determined during the testing and mixing operation.

Operation S208 is an operation of storing a frame generated through operations 201 to 207 in a frame buffer and displaying the frame stored in the frame buffer through a display device.

The general concept of the graphics pipeline 101 has been briefly described with reference to FIG. 2, and more detailed processes are known to those skilled in the art.

Figure 3:
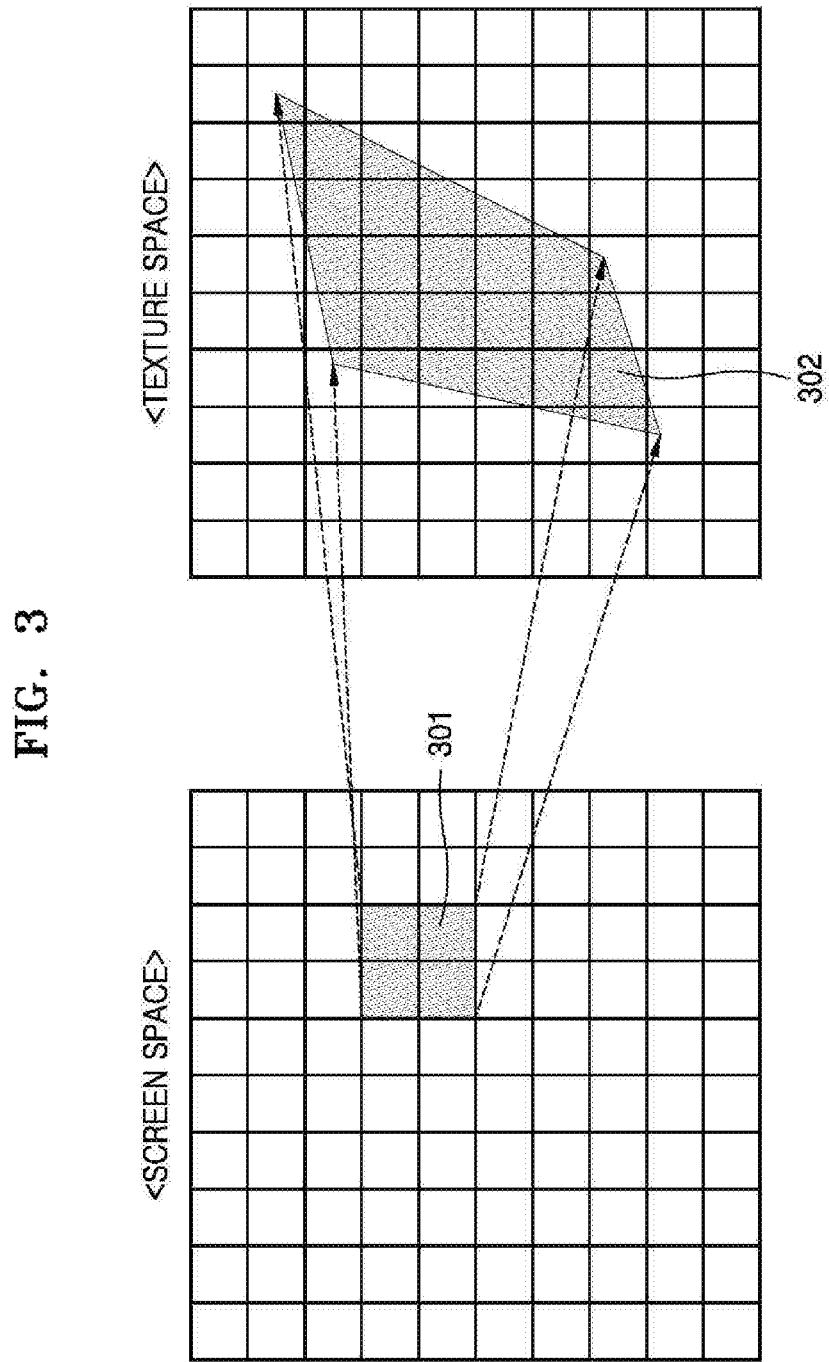
FIG. 3 is a diagram for describing mapping between pixels and a texture, according to an embodiment.

FIG. 3 is a diagram for describing mapping between pixels and a texture, according to an embodiment. Referring to FIG. 3, when pixels 301 on a screen space are generated through rasterization, a pixel shader determines a texture 302 to be mapped to the pixels 301. The texture 302 is determined as texture coordinates on a texture space that has information regarding a color, a texture, a pattern or the like of a portion of any 3D object and is composed of texels.

When the pixels 301 and the texture are mapped to each other, the pixel shader shades the pixels 301 on the screen space by determining values (color values) of the pixels 301 to correspond to the color, texture, pattern or the like included in the mapped texture 302.

The size of the object to be displayed on the screen space may change with a change in camera viewpoint. This may cause a variation in the resolution of the texture 302 to be mapped to the pixels 310. For example, as the camera viewpoint becomes farther away or closer, an object is displayed in a smaller or larger size on the screen space. Accordingly, the texture to be mapped to the pixels 301 also decreases or increases in size. In this case, the above-described mipmap may be utilized.

Figure 4:
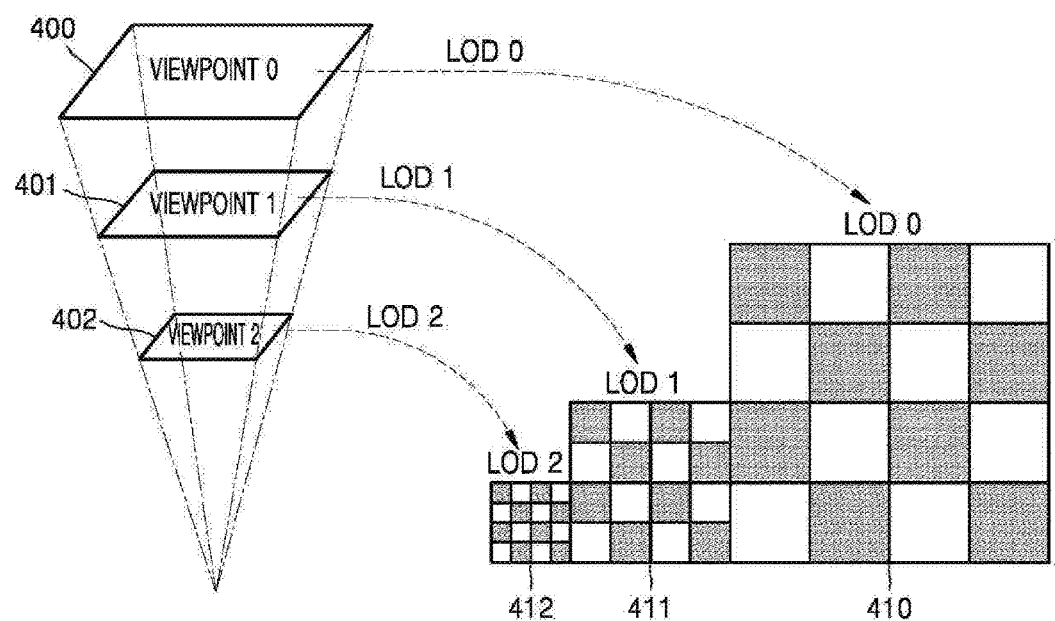
FIG. 4 is a diagram for describing a mipmap, according to an embodiment.

FIG. 4 is a diagram for describing a mipmap, according to an embodiment. For the purpose of enhancing the rendering speed, the mipmap is a set of bitmap images composed of a base texture and textures obtained in advance by continuously reducing the base texture. Referring to FIG. 4, as viewpoints 400, 401, and 402 are changed, the texture to be mapped to the pixels also varies in size. For example, a texture 410 to be mapped to the pixels on the screen space at viewpoint 0 400 is larger than a texture 412 to be mapped to the pixels on the screen space at viewpoint 2 402.

In the mipmap, the size of the texture to be mapped to the pixels on the screen space is determined by calculating a level of detail (LOD). For example, the LOD may be calculated using Equation (1) below, but is not limited thereto.

$$\lambda = \log_2[\text{MAX}\{\sqrt{(du/dx)^2+(dv/dx)^2},\sqrt{(du/dy)^2+(dv/dy)^2}\}] \quad \text{[Equation (1)]}$$

where $\lambda$ is a value of the LOD, u and v are texture coordinates on a texture coordinate axis in the texture space, and x and y are pixel coordinates on a screen coordinate axis in the screen space.

In order to use the mipmap, LODs of pixels in the screen space may be determined in units of quads. Quads will be described below with reference to FIG. 5.

Figure 5:
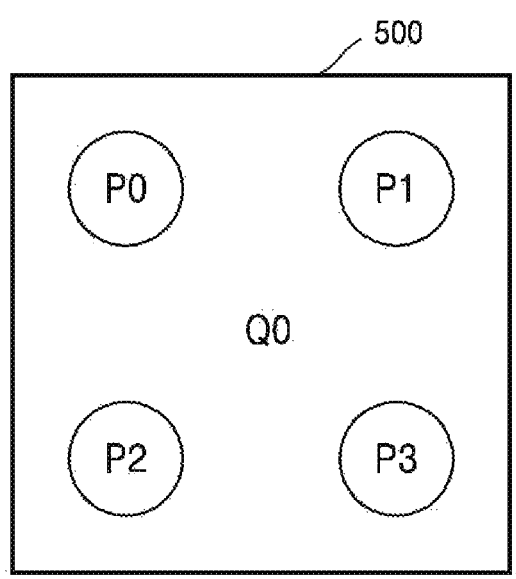
FIG. 5 is a diagram for describing a quad, according to an embodiment.

FIG. 5 is a diagram for describing a quad Q0 500, according to an embodiment.

Referring to FIG. 5, a quad is defined as a set of 2×2 pixels in the embodiments. For example, the quad Q0 500 denotes a set of 2×2 pixels P0, P1, P2, and P3. The calculation of the LODs using Equation (1), which is described above with reference to FIG. 4, may be performed on the quad Q0 500. In detail, in Equation (1), "dx" indicates a variation in pixel coordinates of any two of the 2×2 pixels P0, P1, P2, and P3 with respect to an x axis, and "dy" indicates a variation with respect to a y axis. In Equation (1), "du" is a variation in texture coordinates corresponding to the two pixels with respect to a u axis, and "dv" is a variation in texture coordinates corresponding to the two pixels with respect to a v axis. That is, the calculation and determination of the LOD are performed in units of a quad.

Figure 6:
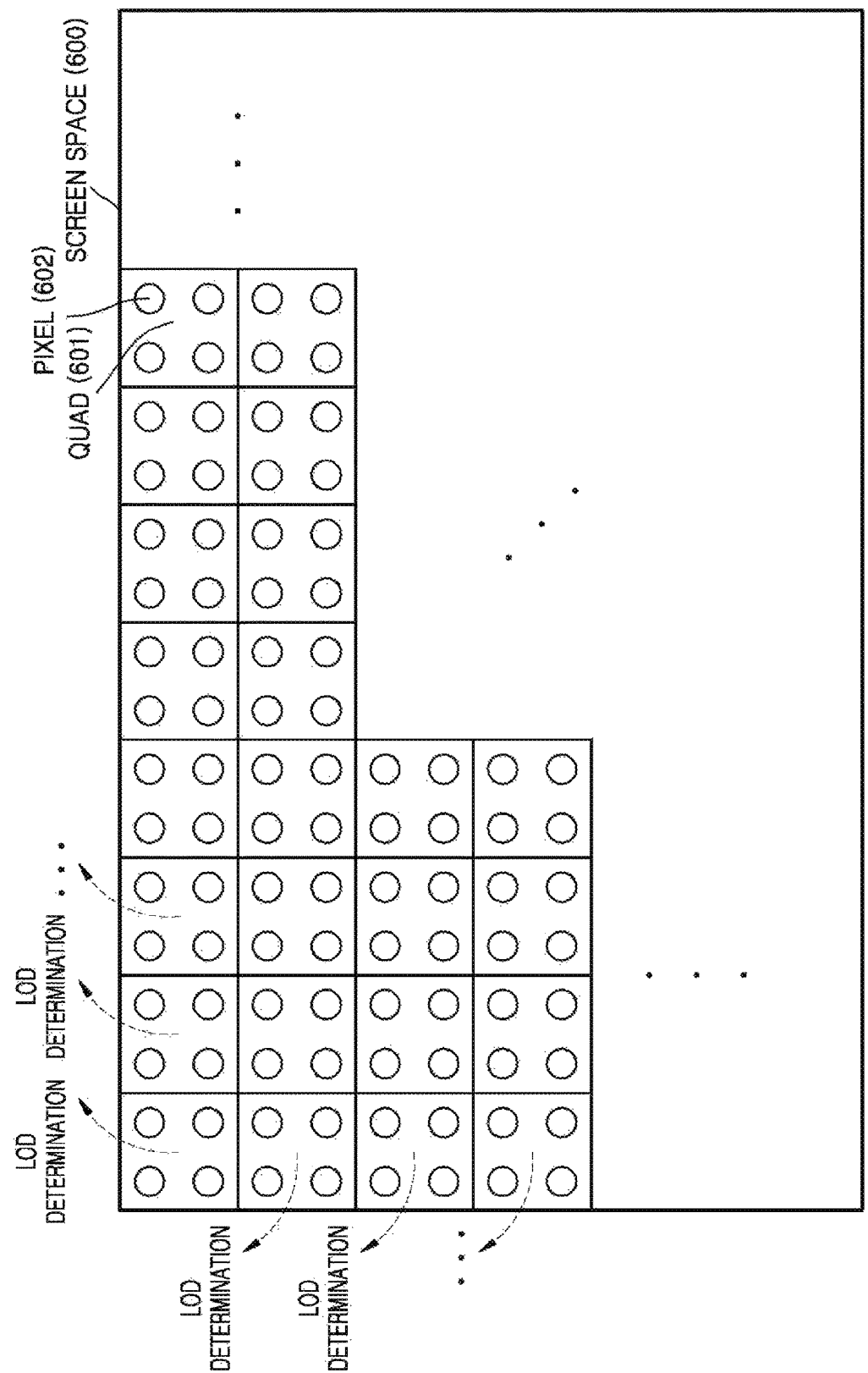
FIG. 6 is a diagram for describing a method of using quads to map a corresponding texture to each pixel on a screen space, according to an embodiment.

FIG. 6 is a diagram for describing a method of using quads 601 to map a corresponding texture to each pixel on a screen space 600, according to an embodiment.

Referring to FIG. 6, in order to determine an LOD for texture mapping, all pixels 602 on the screen space 600 are divided into the quads 601 having 2×2 pixels. The LOD determination is performed on each of the quads 601. When the determination of the LODs of all the quads 601 is completed, texture mapping of the entire screen space 600 to any frame may be completed. Conventionally, the LODs have directly been calculated for the quads 601 through the LOD calculation method such as Equation (1). However, as shown in Equation (1), an LOD operation involves multiple multiplication and division operations. In addition, although approximated operations are performed instead of a log operation consuming many resources, multiple multiplication and division operations are still performed, and thus the repeated performing of the LOD operations may decrease processing performance of the GPU 10 and consume a large amount of power.

According to an embodiment disclosed herein, individual LOD operations for all of the quads 601 on the screen space 600 need not be performed, and the LODs of all of the quads 601 may be determined more efficiently. This will be described later in more detail.

Figure 7:
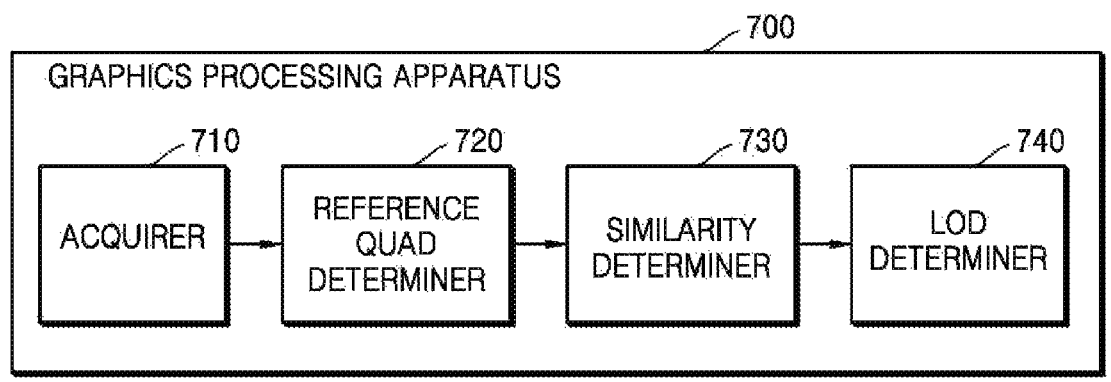
FIG. 7 is a block diagram showing a hardware configuration of a graphics processing apparatus, according to an embodiment.

FIG. 7 is a block diagram showing a hardware configuration of a graphics processing apparatus 700, according to an embodiment. Referring to FIG. 7, the graphics processing apparatus 700 includes an acquirer 710, a reference quad determiner 720, a similarity determiner 730, and an LOD determiner 740. In FIG. 7, only elements associated with embodiments disclosed herein are shown as being included in the graphics processing apparatus 700. Accordingly, it is to be understood by those skilled in the art that other general-purpose elements may be included in addition to the elements shown in FIG. 7.

The graphics processing apparatus 700 is hardware that processes LOD determination for a texturing operation. The graphics processing apparatus 700 may correspond to the GPU 10 described with reference to FIG. 1, the CPU 20, or other types of processors, or may be implemented to include all of the processors. The acquirer 710, the reference quad determiner 720, the similarity determiner 730, and the LOD determiner 740 may be implemented as sub elements of a texture processor in the GPU 10, but are not limited thereto.

The acquirer 710 acquires texture coordinate data on pixels included in an upper block. In detail, the acquirer 710 acquires pixel coordinate data of the pixels included in the upper block and texture coordinate data corresponding to the pixels included in the upper block.

In the embodiments described herein, the upper block is defined as two or more sets of quads including pixels. For example, the upper block may be a block including 1×2 quads of 8 pixels, 2×1 quads of 8 pixels, 2×2 quads of 16 pixels, 4×2 quads of 32 pixels, 2×4 quads of 32 pixels, and 4×4 quads of 64 pixels, and may also include more quads.

The reference quad determiner 720 determines a reference quad among quads included in the upper block. The reference quad may be defined as any one quad that is a criterion for determining a similarity with the upper block among the quads. For example, the reference quad may be a quad positioned close to the center of the upper block among quads included in the upper block, but is not limited thereto.

The similarity determiner 730 uses texture coordinates of the reference quad and the upper block to determine a similarity between the reference quad and the upper block. The similarity determiner 730 may use a distance between texture coordinates (hereinafter referred to as first texture coordinates) corresponding to two pixels of the reference quad and a distance between texture coordinates (hereinafter referred to as second texture coordinates) corresponding to two pixels positioned at two edges of the upper blocks in order to determine the similarity. Here, the first texture coordinates may be two sets of texture coordinates separated by the maximum distance (hereinafter referred to as a first distance) among texture coordinates corresponding to four pixels of the reference quad, and the second texture coordinates may be two sets of texture coordinates separated by the maximum distance (hereinafter referred to as a second distance) among texture coordinates corresponding to four pixels positioned at four edges of the upper block. A "maximum distance" as described herein refers to a greatest distance between any two sets of texture coordinates in a reference quad or a block. Furthermore, the similarity determiner 730 determines the similarity using the first distance and the second distance only when the two pixels of the reference quad and the two pixels positioned at the two edges of the upper block are pixels of corresponding positions. That is, although the first distance and the second distance indicate the maximum distances in the textures corresponding to the reference quad and the upper block, respectively, the similarity determiner 730 determines that the reference quad and the upper block are not similar without the similarity determination when the first distance and the second distance do not come from the pixels of corresponding positions. Here, the two pixels of the reference quad and the two pixels positioned at the two edges of the upper block being pixels of corresponding positions may denote that the texture coordinates corresponding to the two pixels of the reference quad and the texture coordinates corresponding to the two pixels positioned at the two edges of the upper block are coordinates on one extended line of the texture.

As a result, first, the similarity determiner 730 determines whether two pixels corresponding to the first texture coordinates separated by the maximum distance among four sets of texture coordinates corresponding to the reference quad and two pixels corresponding to the second texture coordinates separated by the maximum distance among four sets of texture coordinates corresponding to the pixels positioned at the four edges of the upper block are pixels of corresponding positions. Next, when it is determined that the two pixels corresponding to the first texture coordinates and the two pixels corresponding to the second texture coordinates are the pixels of the corresponding positions, the similarity determiner 730 uses the first distance, which is the maximum distance between the first texture coordinates, and the second distance, which is the maximum distance between the second texture coordinates, to determine the similarity.

When an absolute value of a difference between the first distance multiplied by N (N is a natural number) and the second distance is less than a threshold value, the similarity determiner 730 determines that the reference quad and the upper block are similar. Here, N is a value based on the number of pixels between the two pixels corresponding to the second texture coordinates in the upper block, and the threshold value is a value that may be arbitrarily set depending on the implementation environment of the graphics processing apparatus 700.

First, the LOD determiner 740 performs an LOD operation such as Equation (1) on the reference quad to determine an LOD of the reference quad. When it is determined that the reference quad and the upper block are similar, the LOD determiner 740 determines LODs of the remaining quads included in the upper block as the LOD of the reference quad. That is, when it is determined by the similarity determiner 730 that the reference quad and the upper block are similar, the LODs of the remaining quads included in the upper block are not calculated individually, but are determined to be the same as the LOD of the reference quad. Accordingly, by using the determination of the similarity between the reference quad and the upper block, individual LOD operations are not performed on all of the quads, thus reducing an amount of operations for LOD determination by the graphics processing apparatus 700 (or the GPU 10 of FIG. 1).

When it is determined that the reference quad and the upper block are not similar, the LOD determiner 740 individually calculates and determines the LODs of the remaining quads included in the upper block, separately from the LOD of the reference quad.

A method of determining LODs of quads will be described in more detail below by sequentially using 2×2 quads, 4×2 quads, and 4×4 quads as an example.

Figure 8:
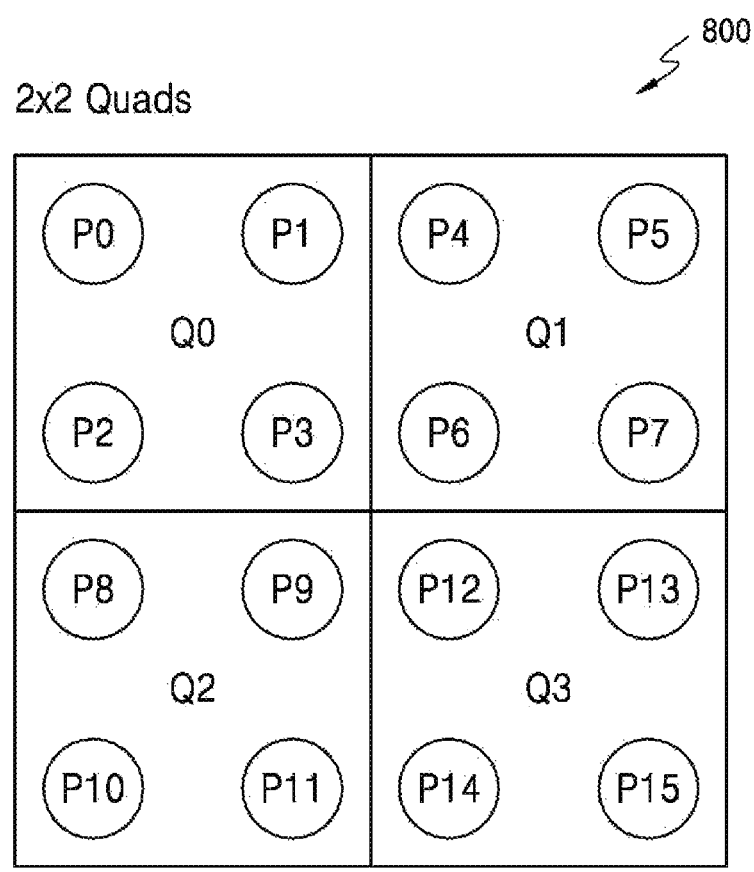
FIG. 8 is a diagram for describing an upper block including 2×2 quads, according to an embodiment.

FIG. 8 is a diagram for describing an upper block 800 including 2×2 quads, according to an embodiment. Referring to FIG. 8, the upper block 800 includes 2×2 quads Q0, Q1, Q2, and Q3. As described above, each of the quads Q0, Q1, Q2, and Q3 include four pixels. For example, quad Q0 includes 2×2 pixels P0 to P3, quad Q1 includes 2×2 pixels P4 to P7, quad Q2 includes 2×2 pixels P8 to P11, and quad Q3 includes 2×2 pixels P12 to P15.

The acquirer 710 of the graphics processing apparatus 700 of FIG. 7 acquires data on pixel coordinates of the pixels P0 to P15 included in the quads Q0 to Q3 constituting the upper block 800, and data on texture coordinates corresponding to the pixels P0 to P15.

Figure 9:
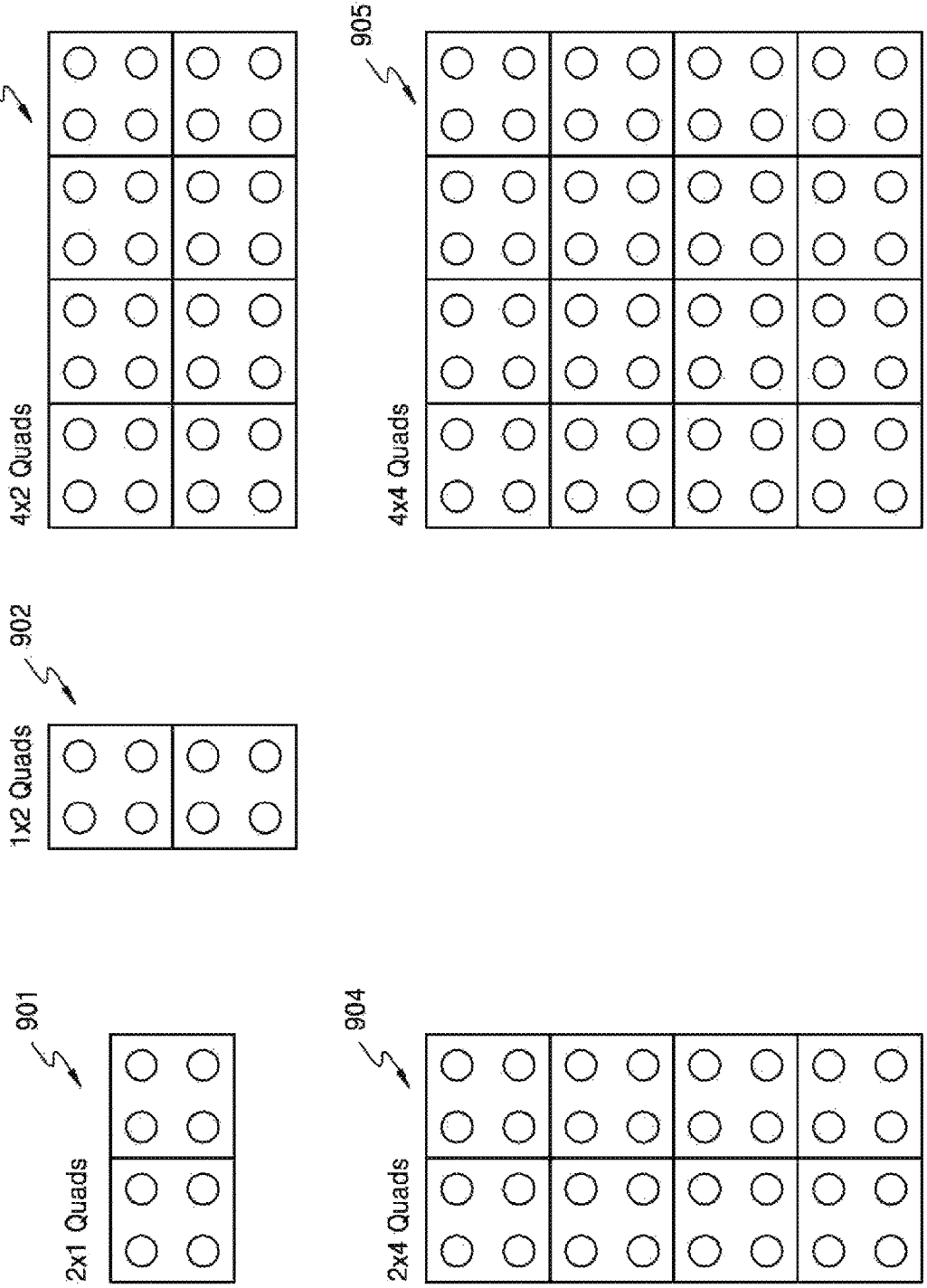
FIG. 9 is a diagram for describing different types of upper blocks, according to an embodiment.

FIG. 9 is a diagram for describing different types of upper blocks 901 through 905 according to an embodiment. Referring to FIG. 9, the graphics processing apparatus 700 may use different types of upper blocks in addition to the upper block 800 described with reference to FIG. 8. For example, the graphics processing apparatus 700 may use an upper block 901 including 2×1 quads of 8 pixels, an upper block 902 including 2×1 quads of 8 pixels, an upper block 903 including 4×2 quads of 32 pixels, an upper block 904 including 2×4 quads of 32 pixels, and an upper block 905 including 4×4 quads of 64 pixels. Although not shown in FIG. 9, the graphics processing apparatus 700 may use upper blocks including more quads. That is, the type of the upper block is not limited to the types specifically disclosed in FIGS. 8 and 9.

First, a method of the graphics processing apparatus 700 using the upper block 800 to determine the LODs of the quads Q0, Q1, Q2, and Q3 included in the upper block 800 will be described below.

Figure 10:
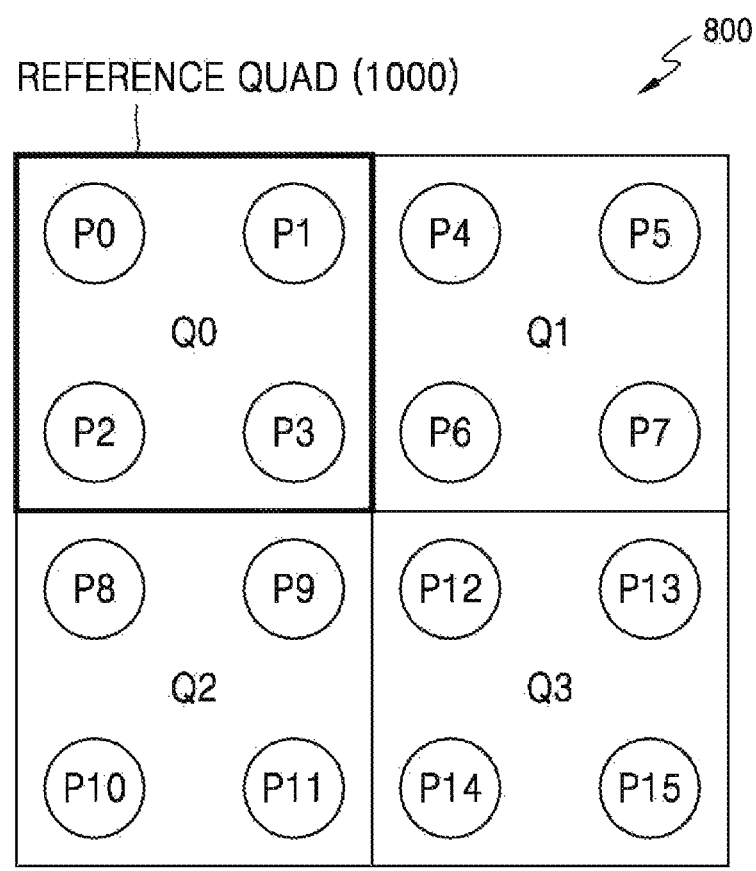
FIG. 10 is a diagram for describing a reference quad, according to an embodiment.

FIG. 10 is a diagram for describing a reference quad 1000 of the upper block 800, according to an embodiment. Referring to FIG. 10, the reference quad determiner 720 may determine, as a reference quad, any one of the 2×2 quads Q0, Q1, Q2, and Q3 included in the upper block 800. In this case, the reference quad determiner 720 determines, as a reference quad, a quad positioned closest to the center of the upper block among the quads included in the upper block. For the upper block 800 including the 2×2 quads, all of the 2×2 quads Q0, Q1, Q2, and Q3 are present at the same position from the center of the upper block 800. Accordingly, any one of the 2×2 quads Q0, Q1, Q2, and Q3 may be determined as a reference quad. For convenience of description, however, it is assumed in the embodiments that the quad Q0 positioned at the upper left corner among the 2×2 quads is determined as the reference quad 1000.

Figure 11:
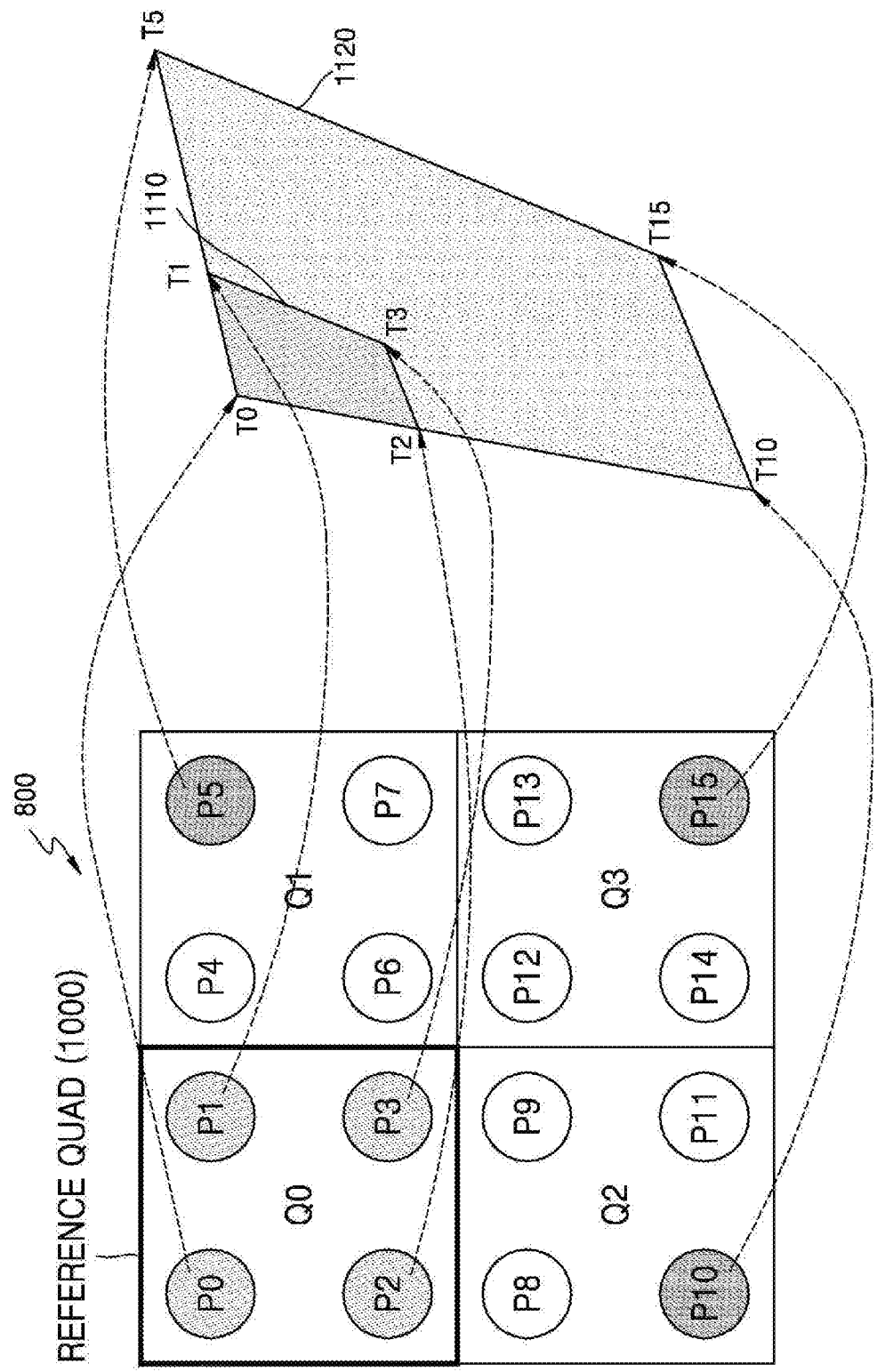
FIG. 11 is a diagram for describing relationships between textures and pixels included in each of a reference quad and an upper block, according to an embodiment.

FIG. 11 is a diagram for describing relationships between textures and pixels included in each of a reference quad and an upper block according to an embodiment. Referring to FIG. 11, the reference quad 1000 is mapped to a texture 1110, and the upper block 800 is be mapped to a texture 1120. Pixels P0, P1, P2, and P3 of the reference quad 1000 are mapped to texture coordinates T0, T1, T2, and T3 of the texture 1110, respectively. Pixels P0, P5, P10, and P15 positioned at the four edges of the upper block 800 are mapped to texture coordinates T0, T5, T10, and T15 of the texture 1120, respectively. Since the upper block 800 includes the reference quad 1000 as described above, the texture 1120 corresponding to the upper block 800 generally includes the texture 1110 corresponding to the reference quad 1000. Such a mapping relationship is included in the data acquired by the acquirer 710.

Figure 12:
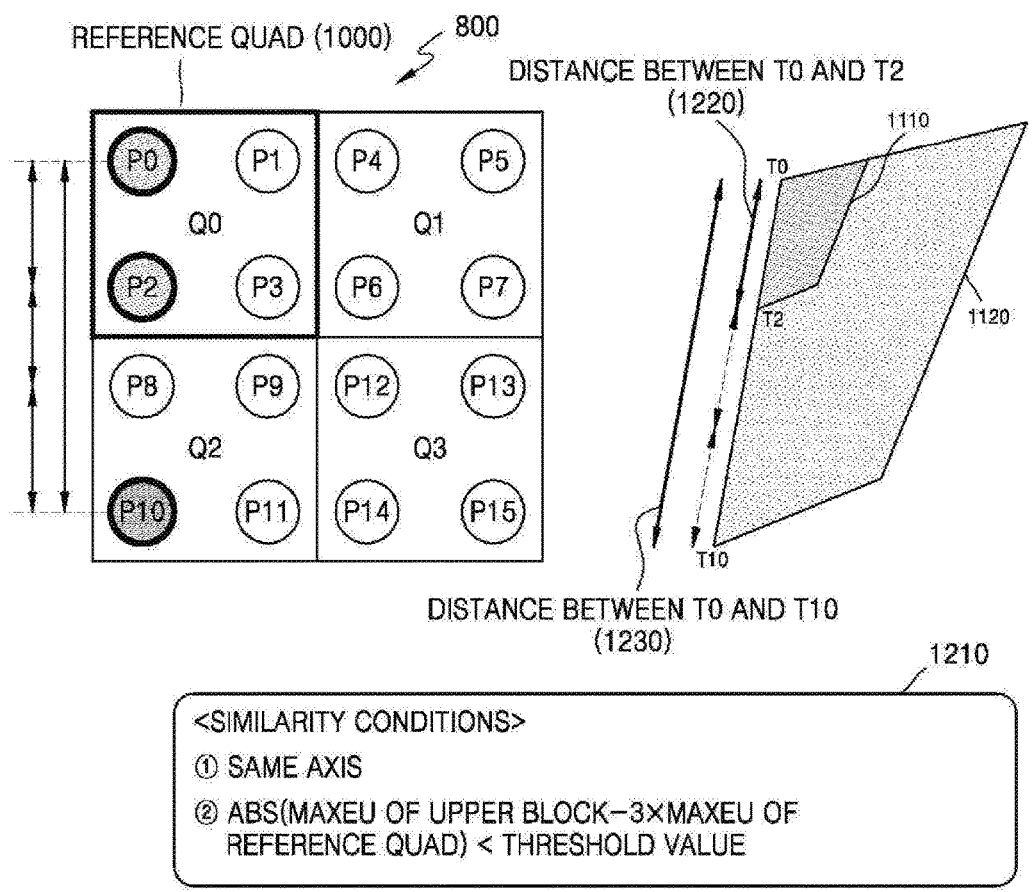
FIG. 12 is a diagram for describing a method of determining a similarity between an upper block and a reference quad, according to an embodiment.

FIG. 12 is a diagram for describing a method of determining a similarity between the upper block 800 and the reference quad 1000, according to an embodiment. Referring to FIG. 12, when a condition ① that two pixels separated by the maximum distance (the first distance 1220) in the reference quad and two pixels separated by the maximum distance (the second distance 1230) among edge pixels of the upper block be on the same axis and a condition ② that an absolute value of a difference between the first distance 1220 multiplied by N (N is a natural number) and the second distance 1230 be less than a threshold value are satisfied, the similarity determiner 730 determines that the upper block 800 and the reference quad 1000 are similar.

In detail, two sets of texture coordinates (first texture coordinates) separated by the maximum distance (the first distance 1220) between texture coordinates, among the four sets of texture coordinates corresponding to the pixels P0, P1, P2, and P3 of the reference quad 1000 are T0 and T2. The texture coordinates (the first texture coordinates) T0 and T2 correspond to the pixels P0 and P2. Two sets of texture coordinates (second texture coordinates) separated by the maximum distance (the second distance 1230) between texture coordinates, among the four sets of texture coordinates corresponding to the edge pixels P0, P5, P10, and P15 of the upper block 800 are T0 and T10. The second texture coordinates T0 and T10 correspond to the pixels P0 and P10.

The similarity determiner 730 determines whether the pixels P0 and P2 corresponding to the first texture coordinates T0 and T2 and the pixels P0 and P10 corresponding to the second texture coordinates T0 and T10 are pixels that are on the same axis. Here, the similarity determiner 730 determines whether the pixels P0 and P2 and the pixels P0 and P10 are on the same axis on the basis of whether the pixels P0 and P2 and the pixels P0 and P10 are on the same x axis, on the same y axis, or on the same diagonal line.

Since the two pixels P0 and P2 having the first distance 1220 are on the same axis (y axis) as the two pixels P0 and P10 having the second distance 1230, it is determined that the above-described condition ① is satisfied. In FIG. 7, it has been described that it is determined whether the two pixels of the reference quad 1000 and the two pixels of the upper block 800 are the pixels of the corresponding positions. This denotes the determination of whether the pixels are on the same axis (or the same extended line).

When condition ① is satisfied, the similarity determiner 730 determines whether an absolute value (ABS) of a difference between the first distance 1220 (MaxEU) multiplied by N (e.g., N=3) and the second distance 1230 (MaxEU) is less than a threshold value according to the next condition ②. Here, EU denotes a Euclidean distance. However, embodiments of the disclosure herein are not limited to a Euclidean distance, and a distance calculated by a method other than Euclidean distance calculation method may be used as the distance value. In FIG. 12, N is set to be 3 so that the distance between the two pixels P0 and P2 is three times the distance between the two pixels P0 and P10 because the four pixels P0, P2, P8, and P10 are between the two pixels P0 and P10 of the upper block 800.

When an absolute value of a difference between the first distance 1220 and the second distance 1230 is less than a threshold value, the similarity determiner 730 determines that the upper block 800 and the reference quad 1000 are similar. A result of the similarity determination may vary when the magnitude of the threshold value is adjusted. Thus, the similarity determiner 730 determines whether conditions ① and ② are satisfied, and determines the similarity between the upper block 800 and the reference quad 1000.

Figure 13:
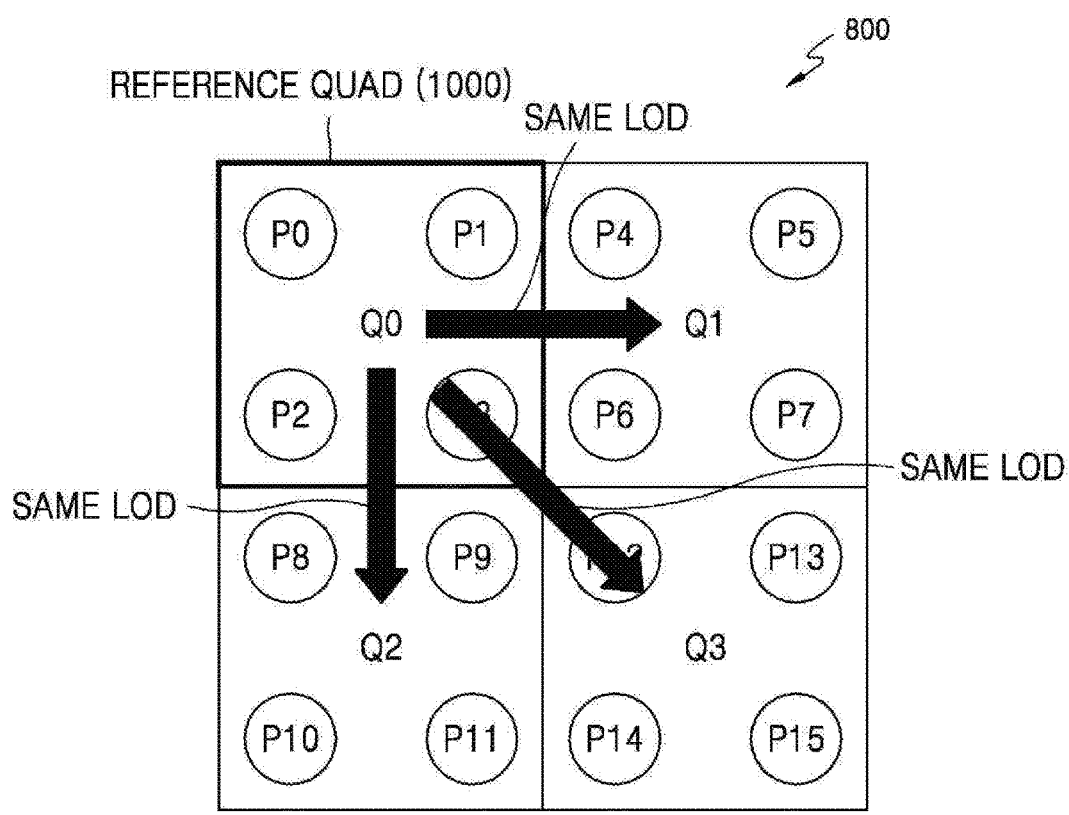
FIG. 13 is a diagram for describing a method of determining LODs of quads included in an upper block when it is determined that a reference quad and an upper block are similar, according to an embodiment.

FIG. 13 is a diagram for describing a method of determining LODs of quads Q0, Q1, Q2, and Q3 included in the upper block 800 when it is determined that the reference quad 1000 and the upper block 800 are similar, according to an embodiment. Referring to FIG. 13, when it is determined that the reference quad 1000 and the upper block 800 are similar, the LODs of the remaining quads Q1, Q2, and Q3 are determined to be the same as the LOD of the reference quad 1000 (Q0). That is, when it is determined that the reference quad 1000 and the upper block 800 are similar, the LOD determiner 740 determines the LODs of quads Q0, Q1, Q2, and Q3 included in the upper block 800 by calculating only the LOD of the reference quad 1000 (Q0).

Figure 14:
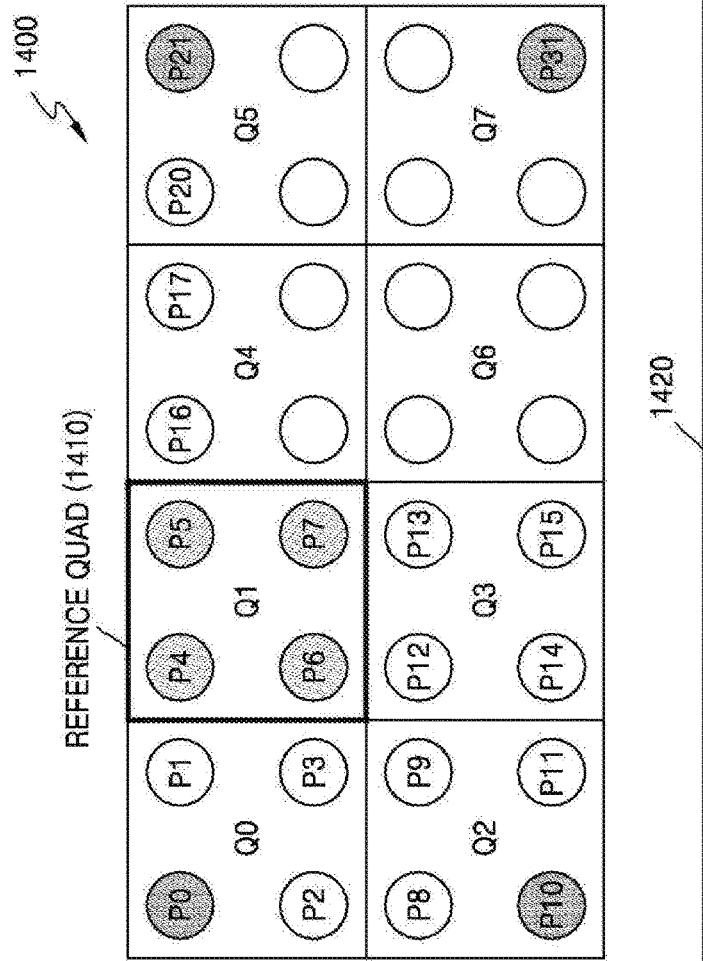
FIG. 14 is a diagram for describing a method of determining an LOD using an upper block of 4×2 quads, according to an embodiment.

FIG. 14 is a diagram for describing a method of determining an LOD using an upper block 1400 of 4×2 quads Q0 through Q7, according to an embodiment. Referring to FIG. 14, a reference quad 1410 (Q1) among the 4×2 quads is determined as the quad closest to the center of the upper block 1400. Here, all of quads Q1, Q3, Q4, and Q6 are quads closest to the center. However, for convenience of description, it is assumed that quad Q1 is the reference quad 1410. According to another embodiment, the reference quad 1410 is determined to be the quad Q0, Q2, Q5, or Q7 rather than the quad Q1.

When quad Q0 is determined as the reference quad 1410, the similarity determiner 730 determines the similarity between the reference quad 1410 and the upper block 1400 on the basis of similarity conditions 1420. However, since the upper block 1400 is composed of rectangular 4×2 quads, condition ② may be applied using a different value for N depending on whether the same axis satisfying condition ① is an x axis, a y axis, or a diagonal line.

For example, when the pixels corresponding to the first distance are P4 and P5, and the pixels corresponding to the second distance are P0 and P21, condition ② of "ABS(MaxEU of upper block-7×MaxEU of reference quad)<threshold value" may be applied. When the pixels corresponding to the first distance are P4 and P6, and the pixels corresponding to the second distance are P0 and P10, condition ② of "ABS(MaxEU of upper block-3×MaxEU of reference quad)<threshold value" may be applied. When the pixels corresponding to the first distance are P4 and P7, and the pixels corresponding to the second distance are P0 and P31, condition ② of "ABS(MaxEU of upper block-7.6× MaxEU of reference quad)<threshold value" may be applied.

When it is determined that the reference quad 1410 and the upper block 1400 are similar, the LOD determiner 740 determines the LODs of the remaining quads Q0, Q2, Q3, Q4, Q5, Q6, and Q7 to be the same as the LOD of the quad Q1, which is the reference quad 1410.

Figure 15:
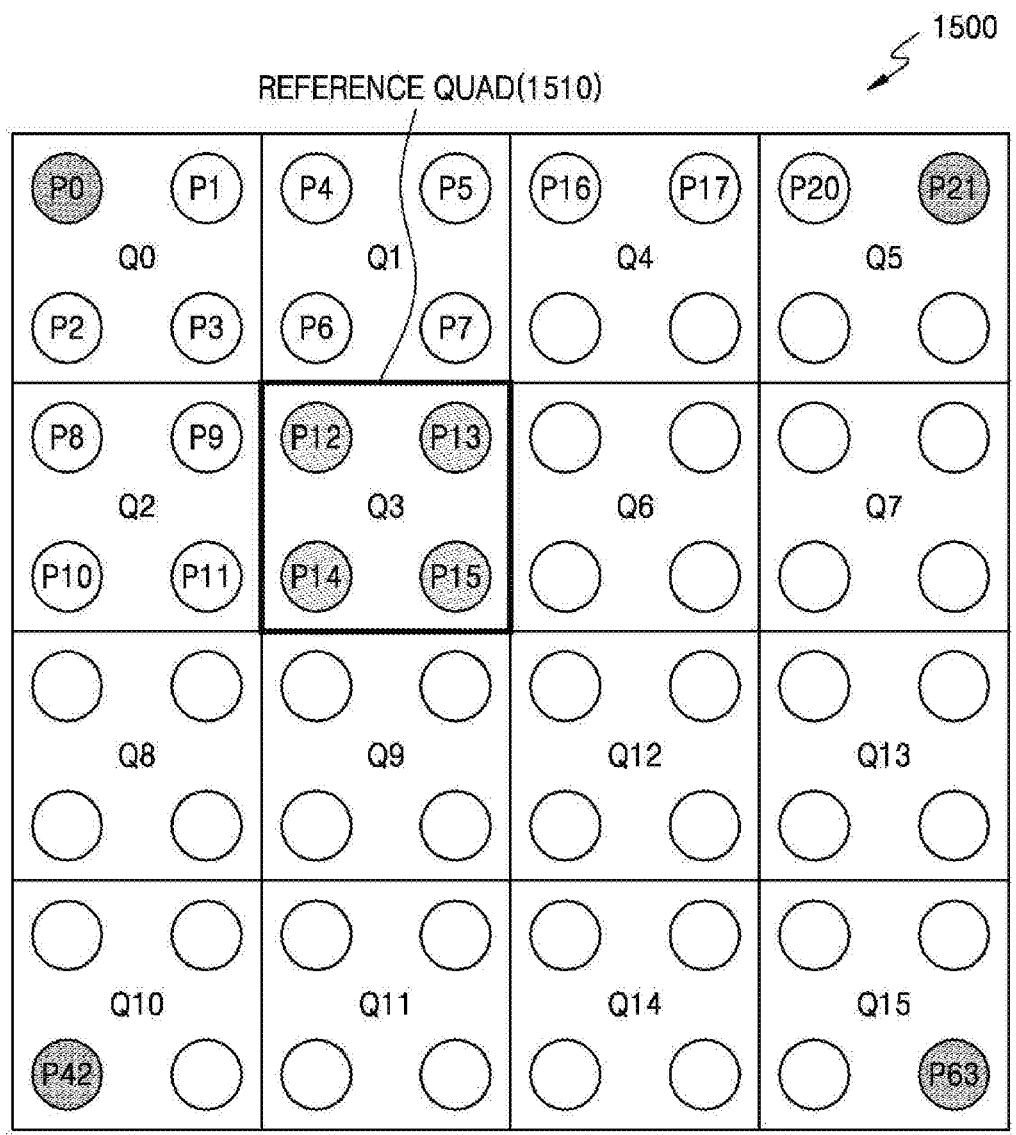
FIG. 15 is a diagram for describing a method of determining an LOD using an upper block of 4×4 quads, according to an embodiment.

FIG. 15 is a diagram for describing a method of determining an LOD using an upper block 1500 of 4×4 quads Q0 through Q15, according to an embodiment. Referring to FIG. 15, the quad Q3 that is closest to the center of the upper block 1500 is determined as a reference quad 1510 among the 4×4 quads Q0 through Q15. Here, all of the quads Q3, Q6, Q9, and Q12 are quads closest to the center. However, for convenience of description, it is assumed that quad Q3 is the reference quad 1510. According to another embodiment, the reference quad 1510 may be determined as any one of the remaining quads other than the quad Q3.

When the quad Q3 is determined as the reference quad 1510, the similarity determiner 730 determines the similarity between the reference quad 1510 and the upper block 1500 on the basis of similarity conditions 1520. Since a distance between two edge pixels of the upper block 1500 is seven times a distance between two pixels included in the reference quad 1510, N may be set to be 7.

When it is determined that the reference quad 1510 and the upper block 1500 are similar, the LOD determiner 740 determines the LODs of the remaining quads Q0, Q1, Q2, Q4, Q5, Q6, Q7, Q8, Q9, Q10, Q11, Q12, Q13, Q14, and Q15 to be the same as the LOD of the quad Q3, which is the reference quad 1510.

Figure 16:
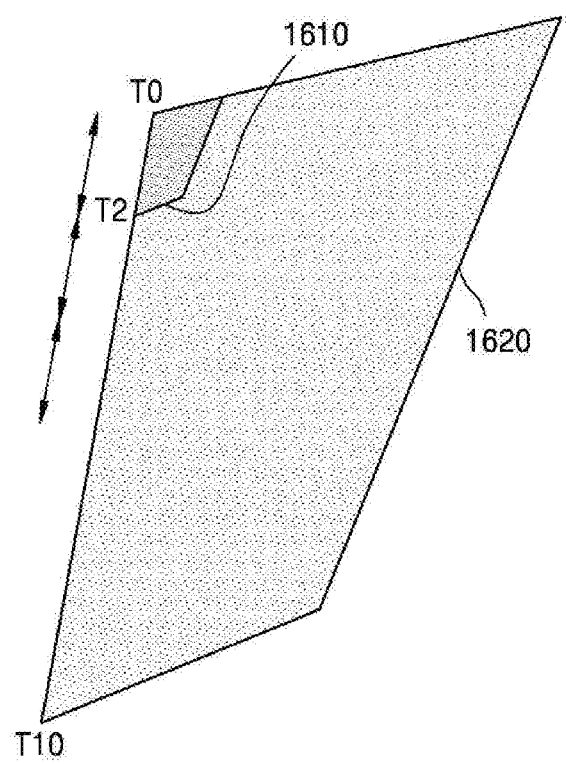
FIG. 16 is a diagram for describing a case in which a reference quad and an upper block are not similar, according to an embodiment.

FIG. 16 is a diagram for describing a case in which the reference quad 1000 and the upper block 800 of FIG. 11 are not similar, according to an embodiment. Referring to FIG. 16, a texture 1610 corresponds to the reference quad 1000, and a texture 1620 corresponds to the upper block 800. Since the first distance between the texture coordinates T0 and T2 of the texture 1610 multiplied by three differs greatly from the second distance between the texture coordinates T0 and T10 of the texture 1620, the first distance may exceed the threshold value. Thus, according to the textures 1610 and 1620 shown in FIG. 16, it is determined that the reference quad 1000 and the upper block 800 are not similar. Accordingly, the LODs of the quads Q0, Q1, Q2, and Q3 included in the upper block 800 are determined individually through an operation of Equation (1).

Figure 17:
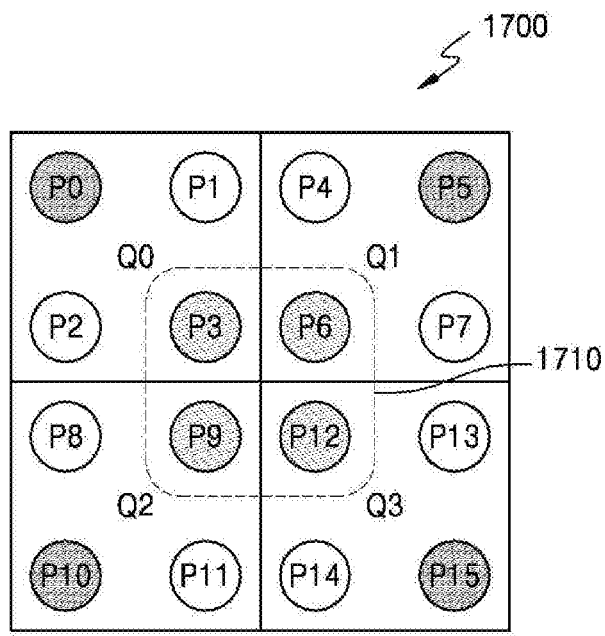
FIG. 17 is a diagram for describing a method of determining LODs of 2×2 quads included in an upper block using reference pixels instead of a reference quad, according to another embodiment.

FIG. 17 is a diagram for describing a method of determining LODs of 2×2 quads Q0, 01, Q2, and Q3 included in an upper block 1700 using reference pixels P3, P6, P9, and P12 instead of a reference quad, according to another embodiment. Referring to FIG. 17, the reference quad determiner 720 determines a reference pixel group 1710 in the upper block 1700, which includes the 2×2 quads Q0, Q1, Q2, and Q3, instead of the reference quad. The reference pixels P3, P6, P9, and P12 included in the reference pixel group 1710 are pixels included in different quads. More specifically, each of the reference pixels P3, P6, P9, and P12 is disposed in a different quad. Although the reference pixels P3, P6, P9, and P12 included in the reference pixel group 1710 are included in different quads, the pixels P3, P6, P9, and P12 are pixels positioned closest to the center of the upper block 1700.

The similarity determiner 730 determines the similarity between the reference pixel group 1710 and the upper block 1700 on the basis of similarity determination conditions 1720, which are similar to the similarity determination conditions 1210 described with reference to FIG. 12.

When it is determined that the reference pixel group 1710 and the upper block 1700 are similar, the LOD determiner 740 calculates an LOD of one of the quads Q0, Q1, Q2, and Q3 and determines LODs of the remaining quads to be the same as the calculated LOD.

That is, according to the embodiment of FIG. 17, it is possible to use the reference pixel group 1710, instead of a reference quad, to efficiently determine the LODs of the quads Q0, Q1, Q2, and Q3 included in the upper block 1700.

Figure 18:
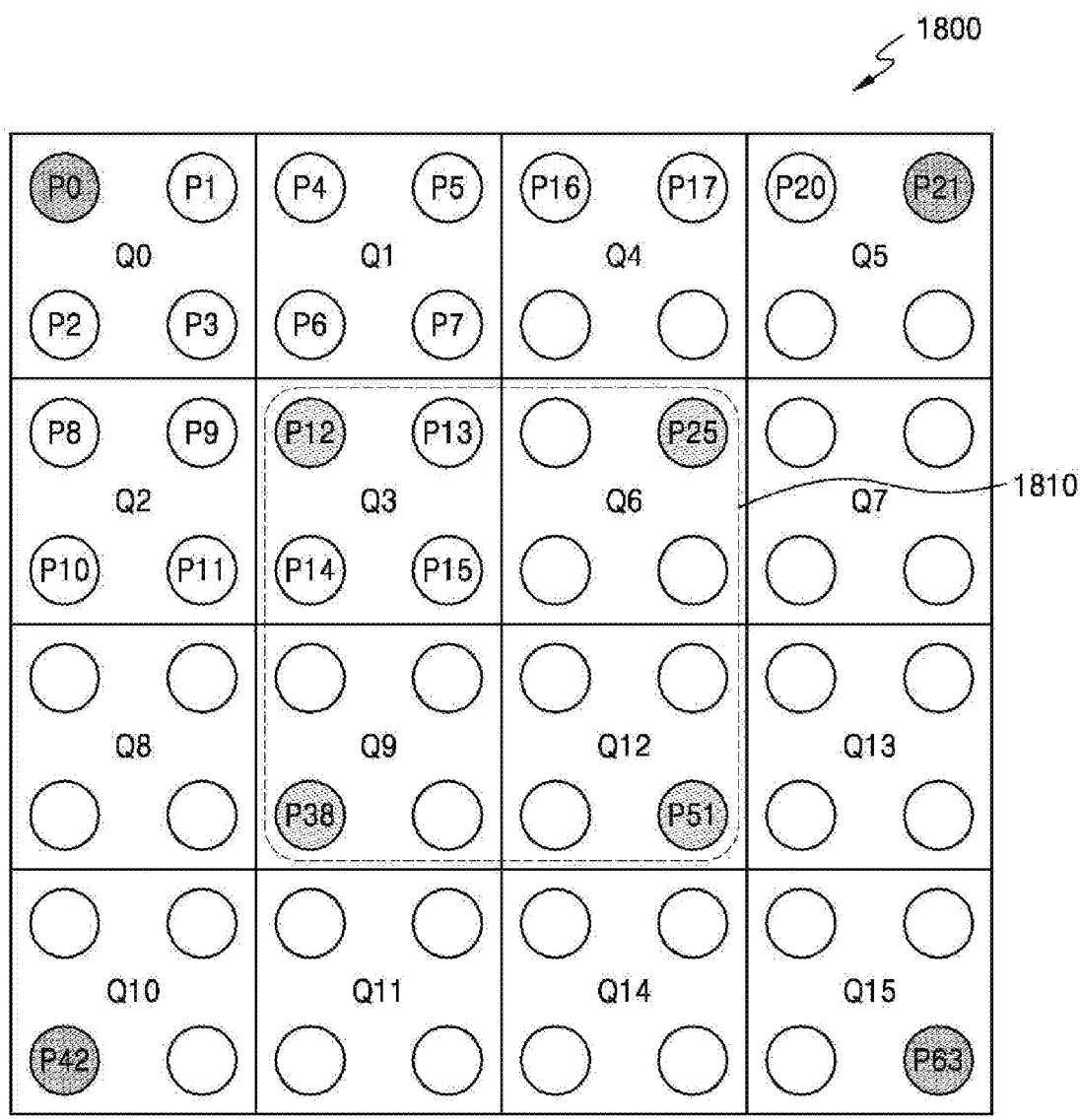
FIG. 18 is a diagram for describing a method of determining LODs of 4×4 quads included in an upper block using reference pixels instead of a reference quad, according to another embodiment.

FIG. 18 is a diagram for describing a method of determining LODs of 4×4 quads Q0 through Q15 included in an upper block 1800 using reference pixels P12, P25, P38, and P51 instead of a reference quad, according to another embodiment. Referring to FIG. 18, the reference quad determiner 720 determines a reference pixel group 1810 including the reference pixels P12, P25, P38, and P51 in the upper block 1800. The reference pixels P12, P25, P38, and P51 included in the reference pixel group 1810 are pixels included in different quads. More specifically, each of the reference pixels P12, P25, P38, and P51 is disposed in a different quad.

The similarity determiner 730 determines the similarity between the reference pixel group 1810 and the upper block 1800. When it is determined that the reference pixel group 1810 and the upper block 1800 are similar, the LOD determiner 740 calculates an LOD of a quad including any one of the pixels P12, P25, P38, or P51 included in the reference pixel group 1810 and determines LODs of the remaining quads to be the same as the calculated LOD.

Figure 19:
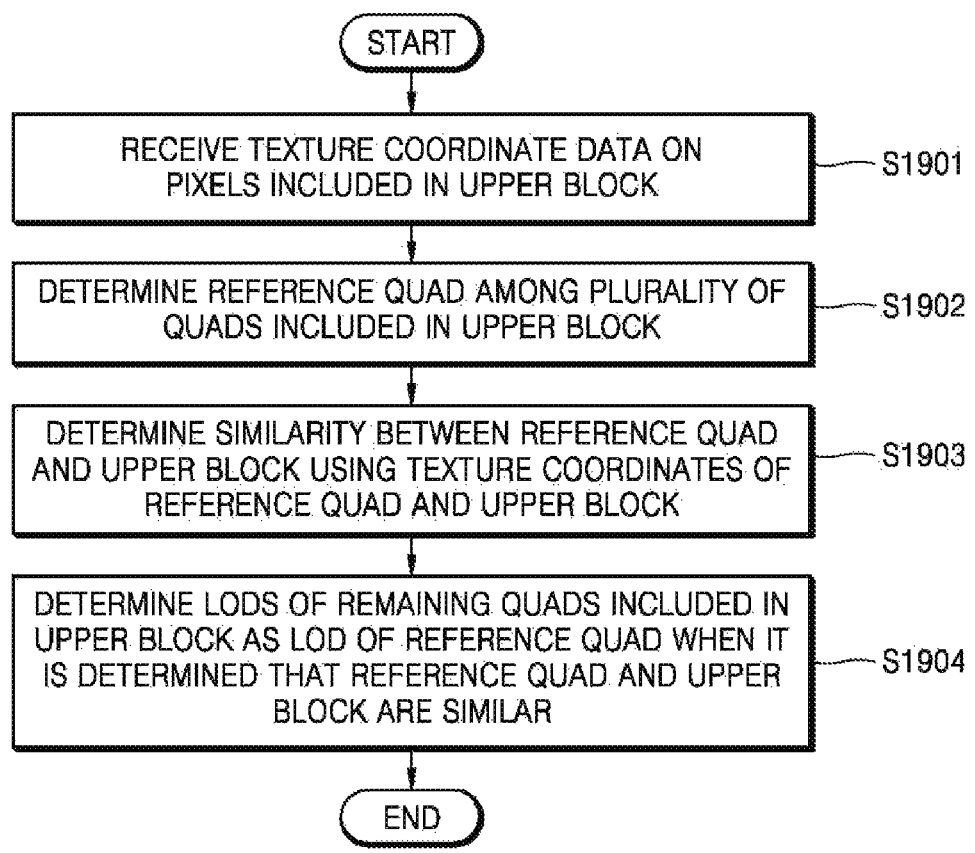
FIG. 19 is a flowchart of a method of determining an LOD for a texturing operation in a graphics processing apparatus, according to an embodiment.

FIG. 19 is a flowchart of a method of determining an LOD for a texturing operation in a graphics processing apparatus, according to an embodiment. Referring to FIG. 19, the LOD determining method includes operations processed in time sequence by the graphics processing apparatus 700 (or the GPU 10) in the above-described figures. Accordingly, the above-description may also be applied to the LOD determining method of FIG. 19 although the description is omitted.

In operation S1901, the acquirer 710 acquires texture coordinate data on pixels included in an upper block.

In operation S1902, the reference quad determiner 720 determines a reference quad among quads included in the upper block.

In operation S1903, the similarity determiner 730 uses texture coordinates of the reference quad and the upper block to determine a similarity between the reference quad and the upper block.

In operation S1904, when it is determined that the reference quad and the upper block are similar, the LOD determiner 740 determines LODs of the remaining quads included in the upper block to be the same as the LOD of the reference quad.

Figure 20:
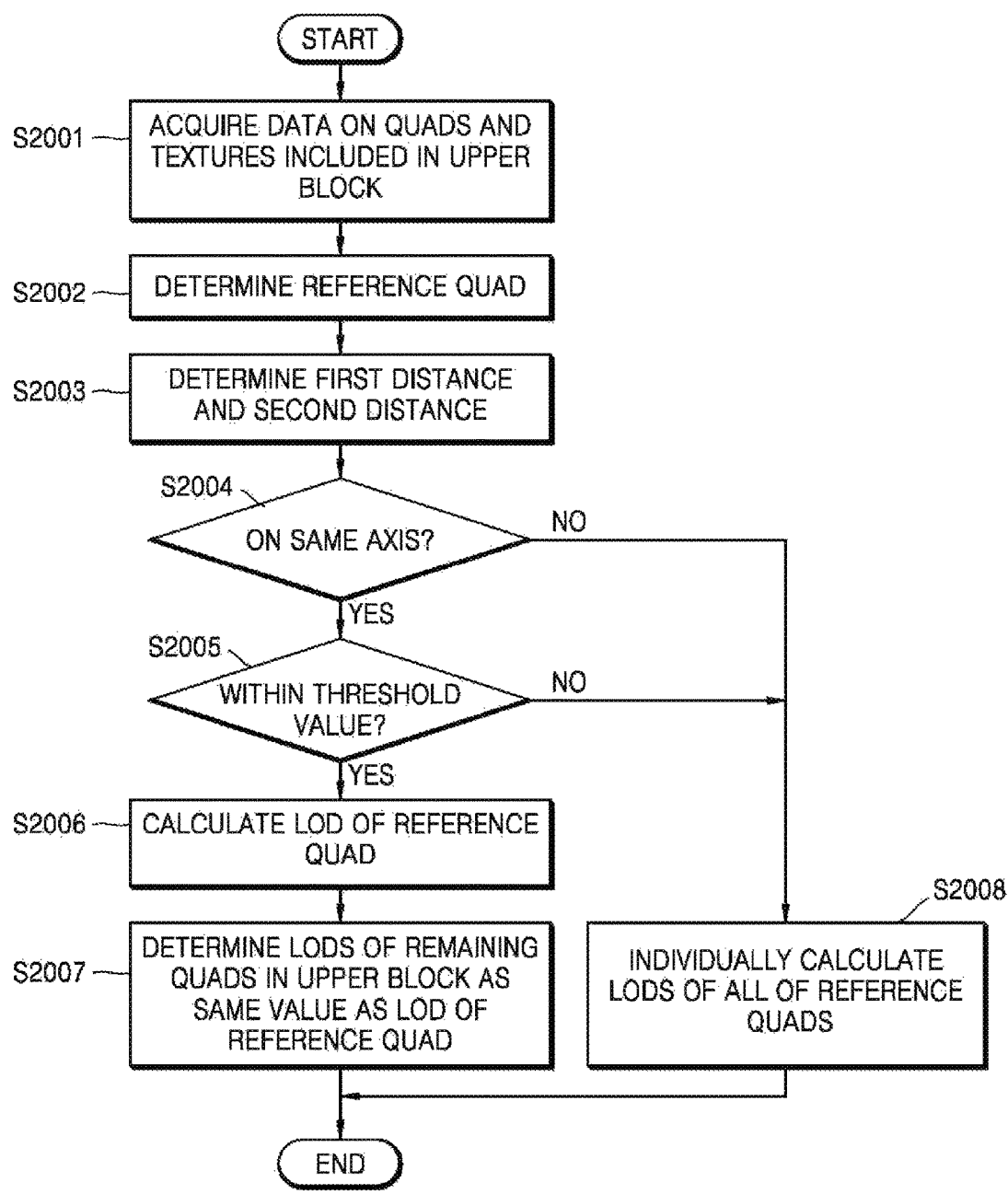
FIG. 20 is a detailed flowchart of the LOD determination method of FIG. 19, according to an embodiment.

FIG. 20 is a detailed flowchart of the LOD determination method of FIG. 19, according to an embodiment.

In operation S2001, the acquirer 710 acquires data on quads and textures included in the upper block. For example, the acquirer 710 acquires pixel coordinate data of the pixels included in the upper block, quad data, and texture coordinate data, etc.

In operation S2002, the reference quad determining unit 720 determines a reference quad among quads included in the upper block.

In operation S2003, the similarity determiner 730 determines the maximum distance (first distance) between the texture coordinates using texture coordinates corresponding to four pixels of the reference quad and determines the maximum distance (second distance) between the texture coordinates corresponding to four pixels positioned at four edges of the upper block.

In operation S2004, the similarity determiner 730 determines whether two pixels of the reference quad corresponding to the first distance and two edge pixels of the upper block corresponding to the second distance are on the same axis. This denotes the above-described determination of condition ①. When it is determined that the two pixels of the reference quad corresponding to the first distance and the two edge pixels of the upper block corresponding to the second distance are on the same axis, the processing proceeds to operation S2005. When it is determined that these pixels are on different axes, the processing proceeds to operation S2008.

In operation S2005, the similarity determiner 730 compares the first distance and the second distance and determines whether a result of the comparison between the first distance and the second distance is within a threshold value. When the comparison result is within the threshold value, it is determined that the reference quad and the upper block are similar. This denotes the above-described determination of condition ②. When it is determined that the comparison result is within the threshold value, the processing proceeds to operation S2006. When it is determined that the comparison result is not within the threshold value, the processing proceeds to operation S2008.

In operation S2006, when it is determined that the reference quad and the upper block are similar, the LOD determiner 740 calculates the LOD of the reference quad. In this case, the LOD of the reference quad is calculated using the LOD operation such as the above-described Equation (1).

In operation S2007, the LOD determiner 740 determines the LODs of the remaining quads in the upper block as the same value as the LOD of the reference quad.

In operation S2008, when it is determined that the reference quad and the upper block are not similar, the LOD determiner 740 individually calculates the LODs of all of the reference quads in the upper block.

According to the embodiments disclosed herein, it is possible to reduce an amount of operations performed by a processor for LOD calculation and enhance the processing speed of the processor.

The apparatuses, units, modules, devices, and other components (e.g., the GPU 10, CPU 20, graphics pipeline 101, memory 30, bus 40, acquirer 710, reference quad determiner 720, similarity determiner 730 and LOD determiner 740) illustrated in FIGS. 1 and 7 that perform the operations described herein with respect to FIGS. 2-6 and 8-20 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2-6 and 8-20. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-6 and 8-20 that perform the operations described herein with respect to FIGS. 1 and 7 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of determining a level of detail (LOD) for a texturing operation, the method comprising:
   acquiring texture coordinate data on pixels included in an upper block;
   determining a reference quad among quads included in the upper block;
   determining a similarity between the determined reference quad and the upper block based on whether texture coordinates of the determined reference quad and texture coordinates of the upper block are corresponded proportionally; and
   determining LODs of remaining quads among the quads included in the upper block to be the same as an LOD of the determined reference quad in response to the determining of the similarity comprising determining that the determined reference quad and the upper block are similar,
   wherein the determining of the similarity comprises:
   determining whether two pixels corresponding to first texture coordinates separated by a maximum distance among four sets of texture coordinates corresponding to the determined reference quad and two pixels corresponding to second texture coordinates separated by a maximum distance among four sets of texture coordinates corresponding to pixels positioned at four edges of the upper block are pixels of corresponding positions; and
   determining the similarity using a first distance, which is the maximum distance between the first texture coordinates, and a second distance, which is the maximum distance between the second texture coordinates, in response to a determination that the two pixels corresponding to the first texture coordinates and the two pixels corresponding to the second texture coordinates are the pixels of the corresponding positions, and
   wherein the determining of the similarity comprises determining that the determined reference quad and the upper block are similar in response to an absolute value of a difference between the first distance multiplied by N and the second distance being less than a threshold value, and wherein N is a natural number.

2. The method of claim 1, wherein, the determining of the similarity comprises determining the similarity using a first distance between first texture coordinates corresponding to two pixels of the determined reference quad and a second distance between second texture coordinates corresponding to two pixels positioned at two edges of the upper block.

3. The method of claim 2, wherein the first texture coordinates comprise two sets of texture coordinates separated by a maximum distance among texture coordinates corresponding to four pixels of the determined reference quad.

4. The method of claim 2, wherein the second texture coordinates comprise two sets of texture coordinates separated by a maximum distance among texture coordinates corresponding to four pixels positioned at four edges of the upper block.

5. The method of claim 2, wherein the determining of the similarity comprises determining the similarity using the first distance and the second distance in response to a determination that the two pixels of the determined reference quad and the two pixels positioned at the two edges of the upper block are pixels of corresponding positions.

6. The method of claim 1, wherein N has a value based on a number of pixels between the two pixels corresponding to the second texture coordinates in the upper block.

7. The method of claim 1, wherein the upper block comprises any one of 1×2 quads of 8 pixels, 2×1 quads of 8 pixels, 2×2 quads of 16 pixels, 4×2 quads of 32 pixels, 2×4 quads of 32 pixels, and 4×4 quads of 64 pixels.

8. The method of claim 1, wherein the determined reference quad is a quad positioned closest to a center of the upper block among the quads included in the upper block.

9. The method of claim 1, wherein the LODs of the remaining quads included in the upper block are determined separately from the LOD of the determined reference quad in response to a determination that the determined reference quad and the upper block are not similar.

10. A non-transitory computer-readable recording medium comprising stored instructions configured to execute the method of claim 1.

11. A graphics processing apparatus comprising:
a processor;
an acquirer implemented by the processor and configured to acquire texture coordinate data on pixels included in an upper block;
a reference quad determiner implemented by the processor and configured to determine a reference quad among quads included in the upper block;
a similarity determiner implemented by the processor and configured to determine a similarity between the determined reference quad and the upper block based on whether texture coordinates of the determined reference quad and texture coordinates of the upper block proportionally correspond; and
a level of detail (LOD) determiner implemented by the processor and configured to determine LODs of remaining quads among the quads included in the upper block to be the same as an LOD of the determined reference quad when it is determined that the determined reference quad and the upper block are similar,
the similarity determiner is configured to:
determine whether two pixels corresponding to first texture coordinates separated by a maximum distance among four sets of texture coordinates corresponding to the determined reference quad and two pixels corresponding to second texture coordinates separated by a maximum distance among four sets of texture coordinates corresponding to pixels positioned at four edges of the upper block are pixels of corresponding positions; and
determine the similarity using a first distance, which is the maximum distance between the first texture coordinates, and a second distance, which is the maximum distance between the second texture coordinates, in response to a determination that the two pixels corresponding to the first texture coordinates and the two pixels corresponding to the second texture coordinates are the pixels of the corresponding positions, and
wherein the similarity determiner is configured to determine that the determined reference quad and the upper block are similar to each other in response to an absolute value of a difference between the first distance multiplied by N and the second distance being less than a threshold value; and
N is a natural number having a value based on a number of pixels between the two pixels corresponding to the second texture coordinates in the upper block.

12. The graphics processing apparatus of claim 11, wherein, the similarity determiner is configured to determine the similarity using a first distance between first texture coordinates corresponding to two pixels of the determined reference quad and a second distance between second texture coordinates corresponding to two pixels positioned at two edges of the upper block.

13. The graphics processing apparatus of claim 12, wherein: the reference quad is comprised of a reference pixel group having a plurality of reference pixels each being included in a different quad, and the first texture coordinates comprise two sets of texture coordinates separated by a maximum distance among texture coordinates corresponding to four reference pixels of the determined reference quad; and
the second texture coordinates comprise two sets of texture coordinates separated by a maximum distance among texture coordinates corresponding to four pixels positioned at four edges of the upper block.

14. The graphics processing apparatus of claim 12, wherein the similarity determiner is configured to determine the similarity using the first distance and the second distance in response to a determination that the two pixels of the determined reference quad and the two pixels positioned at the two edges of the upper block being pixels of corresponding positions.

15. The graphics processing apparatus of claim 11, wherein the upper block includes any one of 1×2 quads of 8 pixels, 2×1 quads of 8 pixels, 2×2 quads of 16 pixels, 4×2 quads of 32 pixels, 2×4 quads of 32 pixels, and 4×4 quads of 64 pixels.

16. The graphics processing apparatus of claim 11, wherein the LOD determiner is configured to determine the LODs of the remaining quads included in the upper block separately from the LOD of the determined reference quad in response to a determination that the determined reference quad and the upper block are not similar.

* * * * *